United States Patent
Forrer, Jr. et al.

(10) Patent No.: US 7,461,202 B2
(45) Date of Patent: Dec. 2, 2008

(54) METHOD AND APPARATUS USING HARD DISK DRIVE FOR ENHANCED NON-VOLATILE CACHING

(75) Inventors: Thomas Richard Forrer, Jr., Round Rock, TX (US); Jason Eric Moore, Austin, TX (US); Asghar Tavasoli, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/121,232

(22) Filed: May 3, 2005

(65) Prior Publication Data

US 2006/0253650 A1 Nov. 9, 2006

(51) Int. Cl.
*G06F 12/08* (2006.01)
*G06F 13/10* (2006.01)
(52) U.S. Cl. .................................. 711/113; 711/173
(58) Field of Classification Search ................ 711/113, 711/173
See application file for complete search history.

(56) References Cited

U.S. PATENT DOCUMENTS

| | | | | |
|---|---|---|---|---|
| 5,353,430 A | * | 10/1994 | Lautzenheiser | 711/117 |
| 5,878,020 A | * | 3/1999 | Takahashi | 369/59.25 |
| 6,301,605 B1 | * | 10/2001 | Napolitano et al. | 709/201 |
| 6,925,526 B2 | * | 8/2005 | Hall | 711/113 |
| 7,099,993 B2 | * | 8/2006 | Keeler | 711/113 |
| 2003/0028719 A1 | * | 2/2003 | Rege | 711/112 |
| 2005/0066121 A1 | * | 3/2005 | Keeler | 711/113 |
| 2006/0080501 A1 | * | 4/2006 | Auerbach et al. | 711/112 |
| 2006/0143543 A1 | * | 6/2006 | Mandrell et al. | 714/43 |
| 2006/0253621 A1 | * | 11/2006 | Brewer et al. | 710/40 |

* cited by examiner

*Primary Examiner*—Matt Kim
*Assistant Examiner*—Hal Schnee
(74) *Attorney, Agent, or Firm*—Duke W. Yee; Diana R. Gerhardt; Lisa L. B. Yociss

(57) ABSTRACT

A method and apparatus is provided for allocating a portion of the OD zone of a hard drive disk to be a non-volatile (NV) caching space, where all writes to the disk are carried out. These write operations can be performed much faster than with conventional techniques, and storage costs may be significantly reduced. The disk drive controller manages the cache, and the host system sees improved throughput, especially for write intensive operations. In one embodiment a method is provided for writing specified data to a disk drive in a computer configuration, the disk drive having a magnetic disk and a volatile cache memory. A specified portion of the OD zone of the disk is reserved for an NV cache space, and the specified data is initially stored in the volatile memory, in response to a write command. The method further includes writing the specified data from the volatile memory to the NV cache space at the disk OD, and subsequently writing the specified data from the NV cache space to a selected longer-term storage location on the disk.

16 Claims, 4 Drawing Sheets

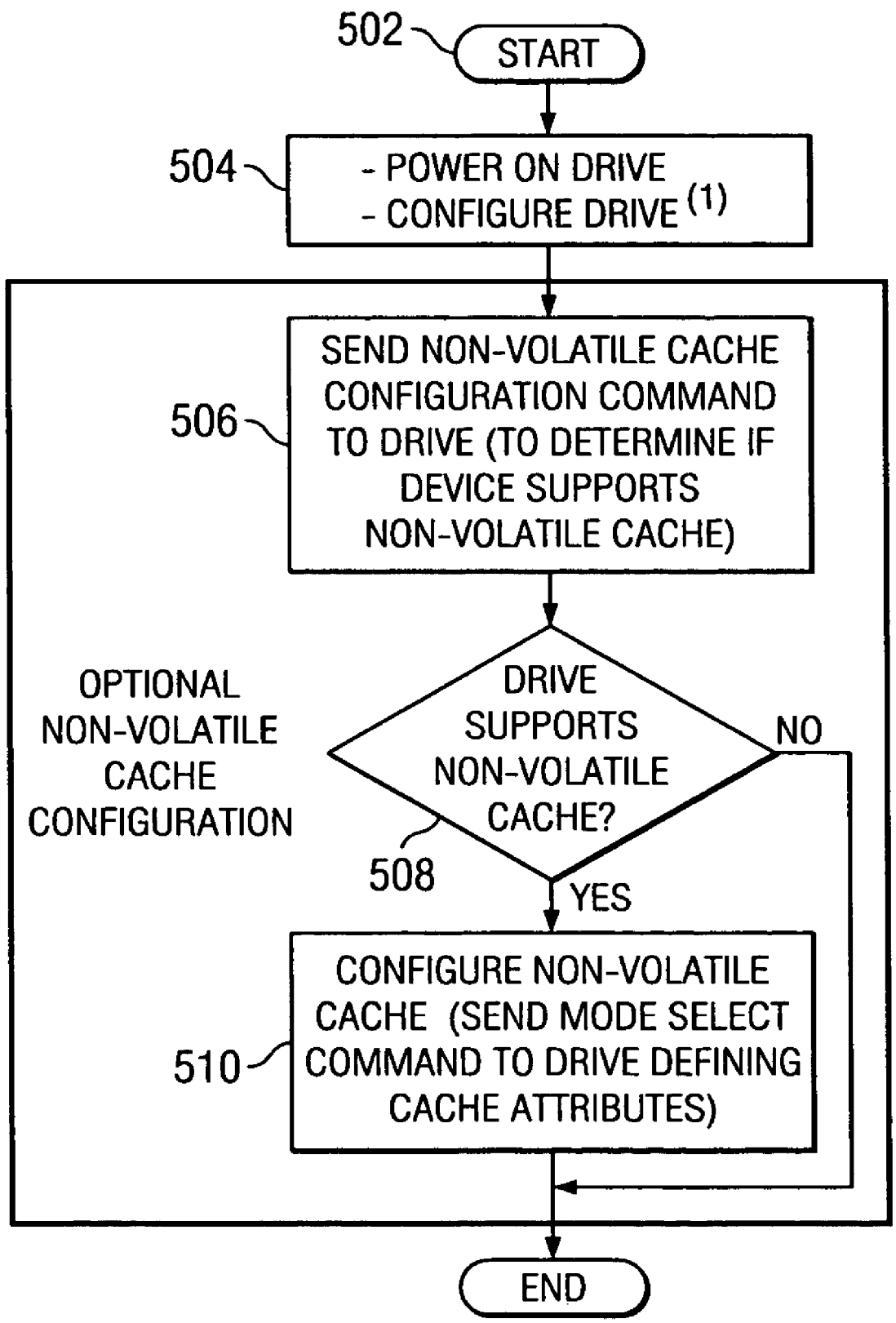

METHOD AND APPARATUS USING HARD DISK DRIVE FOR ENHANCED NON-VOLATILE CACHING

BACKGROUND OF THE INVENTION

1. Technical Field

The invention disclosed and claimed herein generally pertains to a method wherein the disk in a hard disk drive is used to provide non-volatile caching space. More particularly, the invention pertains to a method of the above type wherein a portion of the Outside Diameter (OD) zone of the hard disk is allocated as caching space, to achieve a faster data storage rate. Even more particularly, the invention pertains to a method of the above type wherein the caching space is managed by the hard drive itself, and is thus transparent to the associated host system.

2. Description of Related Art

Hard disk drive performance has not kept up with the performance of the Central Processing Unit (CPU) for a number of years. The method used to mitigate this performance gap has been to have various speed levels of solid state caching, in order to increase the probability that most of the acquired data is in semiconductor storage, rather than on a disk drive. However, semiconductor storage takes more power and is more expensive, on a per bit basis, than storage on a magnetic hard drive. Accordingly, it would be desirable to provide an approach to data storage that was faster than current methods, and at the same time was more cost effective.

Current disk drive technology uses what can be described as constant density recording. That is, the spacing between magnetic transitions written to the magnetic media is kept relatively constant. Thus, the outer edge of each disk surface can hold more data then the inner edge of the disk. To take advantage of these characteristics, disk drive vendors divide the surface into multiple zones. In each zone, the read/write electronics of the disk drive records and reads data at different data rates, the Outside Diameter (OD) zone having the highest data rate, and the Inside Diameter (ID) zone having the lowest data rate. In accordance with the invention, and as described hereinafter in further detailed, these characteristics of a hard disk drive are used to provide an improved data storage system, having significantly higher speed and reduced cost in comparison with conventional systems.

SUMMARY OF THE INVENTION

In making the invention, it has been recognized that if a portion of the OD zone of the hard drive disk is allocated as a caching space, where all writes to the disk are carried out, these write operations can be performed much faster. This can provide the associated host system with a new level of higher speed storage, at a lower cost per bit. In embodiments of the invention, the disk drive controller firmware manages the cache, and the host system will see improved throughput, especially for write intensive operations. Moreover, it is anticipated that hard drive capacity has now increased to a point where giving up 1-2 gigabytes of such capacity, for use as a specialized cache, is a trade-off that many users will be willing to make. In one useful embodiment, a method is provided for writing specified data to a disk drive in a computer configuration, the disk drive having at least one magnetic disk and a volatile cache memory. The method comprises the steps of reserving a specified portion of the OD zone of a selected disk for a non-volatile (NV) cache space, and initially storing the specified data in the volatile memory, in response to a write command sent to the disk drive. The method further comprises writing the specified data from the volatile memory to the NV cache space at the selected disk OD, and then subsequently writing the specified data from the NV cache space to a selected longer-term storage location on the disk.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flow chart showing setup of the NV cache, in accordance with the embodiment of the invention shown in FIG. 2.

DETAILED DESCRIPTION OF THE PREFERRED EMBODIMENT

Figure 1:
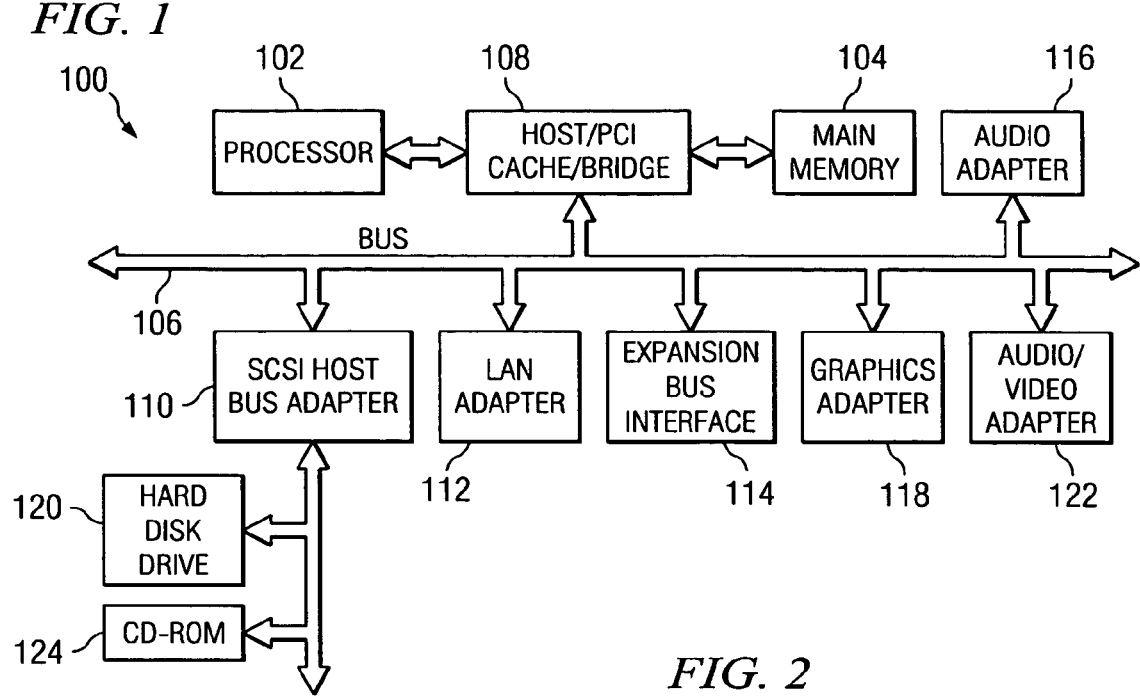
FIG. 1 is a block diagram showing components for a computer system that includes a host system adapted to implement an embodiment of the invention.

Referring to FIG. 1, there is shown a block diagram of a generalized data processing system 100 in which the present invention may be implemented. Data processing system 100 exemplifies a computer, in which code or instructions for implementing the processes of the present invention may be located. Data processing system 100 usefully employs a peripheral component interconnect (PCI) local bus architecture, although other bus architectures such as Accelerated Graphics Port (AGP) and Industry Standard Architecture (ISA) may alternatively be used. FIG. 1 shows a processor 102 and main memory 104 connected to a PCI local bus 106 through a Host/PCI bridge 108. PCI bridge 108 also may include an integrated memory controller and cache memory for processor 102.

Referring further to FIG. 1, there is shown a local area network (LAN) adapter 112, a small computer system interface (SCSI) host bus adapter 110, and an expansion bus interface 114 respectively connected to PCI local bus 106 by direct component connection. Audio adapter 116, a graphics adapter 118, and audio/video adapter 122 are connected to PCI local bus 106 by means of add-in boards inserted into expansion slots. SCSI host bus adapter 110 provides a connection for hard disk drive 120, and also for CD-ROM drive 124. The SCSI host bus adapter 110 and hard disk drive 120 are used in implementing an embodiment of the invention, as described hereinafter.

An operating system runs on processor 102 and is used to coordinate and provide control of various components within data processing system 100 shown in FIG. 1. The operating system may be a commercially available operating system such as WINDOWS XP, which is available from MICROSOFT Corporation. Instructions for the operating system and for applications or programs are located on storage devices, such as hard disk drive 120, and may be loaded into main memory 104 for execution by processor 102.

Figure 2:
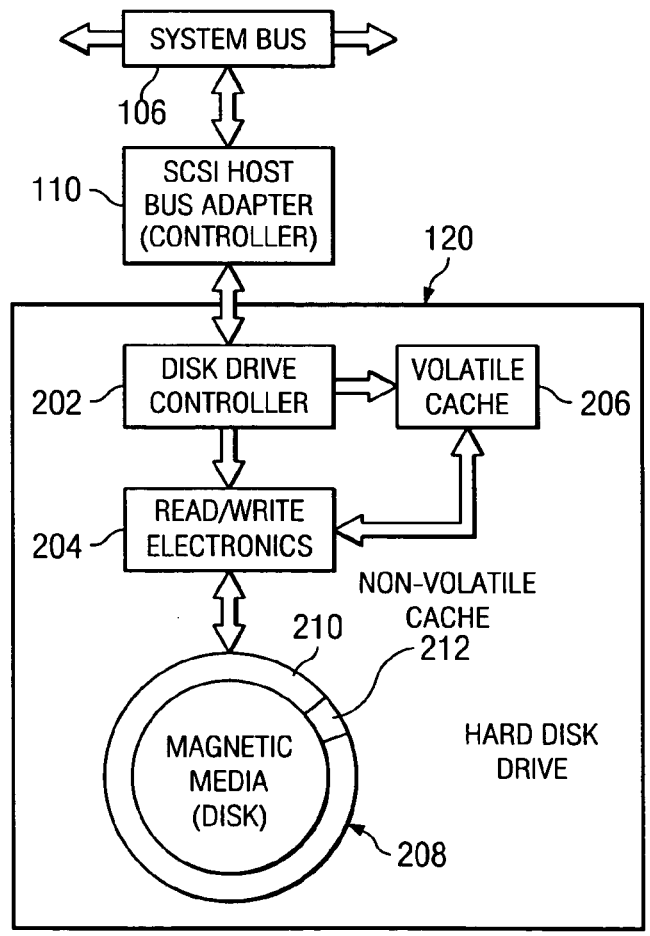
FIG. 2 is a block diagram showing the host system of FIG. 1, together with a hard disk drive used to implement an embodiment of the invention.

Referring to FIG. 2, there is shown the SCSI host bus adapter 110, or host controller, coupled to the disk drive controller 202 of hard disk drive 120. Disk drive controller 202 is connected to operate the hard drive read/write electronics 204, and is also connected to the drive volatile cache memory 206. Read/write electronics 204 is provided to write data into and read data from locations on the surface of magnetic media, such as disk 208, of hard disk drive 120. The read/write electronics 204 is also configured to transfer data between volatile cache 206 and storage locations 212 of disk 208. Usefully, the volatile cache 206 is embedded on the same board or card that contains disk drive controller 202.

Referring further to FIG. 2, there is shown disk 208 provided with an OD zone 210. As previously described, typical hard drive capacity has now become sufficiently large that 1-2 gigabytes of such capacity may be allocated for use as a specialized non-volatile cache. Moreover, data can be written to the outer edge, or OD zone, of disk 208 much more rapidly than to the inner diameter (ID) zone thereof. More particularly, read/write electronics 204 can write data to the OD zone of the disk 208 at a rate on the order of 70 mb/sec., but can write to the ID zone only at a rate on the order of 50 mb/sec.

Thus, in accordance with the invention, non-volatile (NV) cache storage locations 212, also referred to as sectors or spaces, are located on the OD zone 210 of disk 208. As is known in the art, a non-volatile cache is a cache that does not lose storage data when the power to the non-volatile cache is turned off or lost. Moreover, it will be seen that the NV cache resides on the disk of the hard drive storage device itself. Accordingly, NV caching space can be managed by the firmware of disk drive controller 202 of disk drive 120. Also, such management by the disk drive 120 can be made transparent to the host controller 110.

Figure 3:
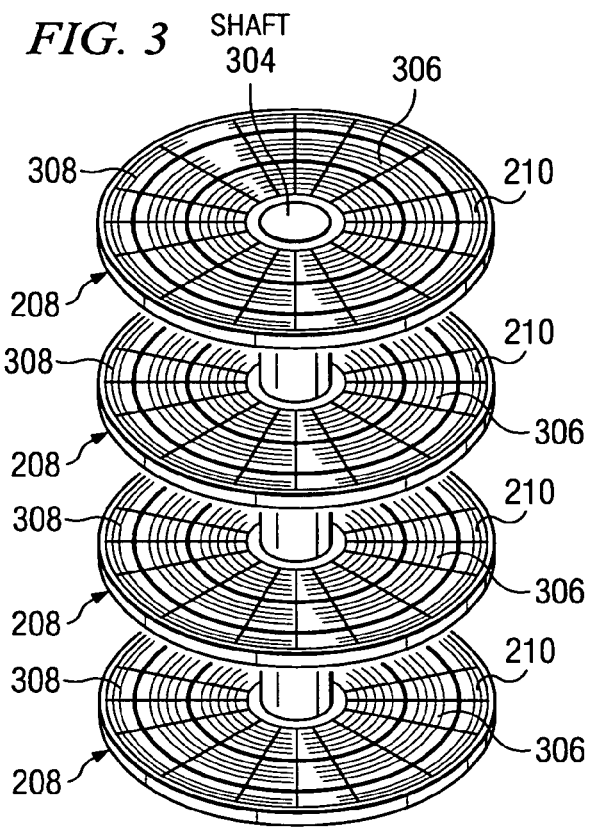
FIG. 3 is a schematic view showing a configuration of disks for the hard disk drive of FIG. 2.

The disk storage media of hard disk drive 120 may usefully be conceptualized as a large number of concentric cylinders, such as $10^4$ or more. Referring to FIG. 3, there is shown a number of disks 208 in stacked relationship, to form a cylindrical configuration 302. Adjacent disks are supported and spaced apart from one another by means of shafts 304. Each disk is provided with concentric tracks 306, with each track being divided into sectors 308 to provide addressable data storage locations.

Figure 4:
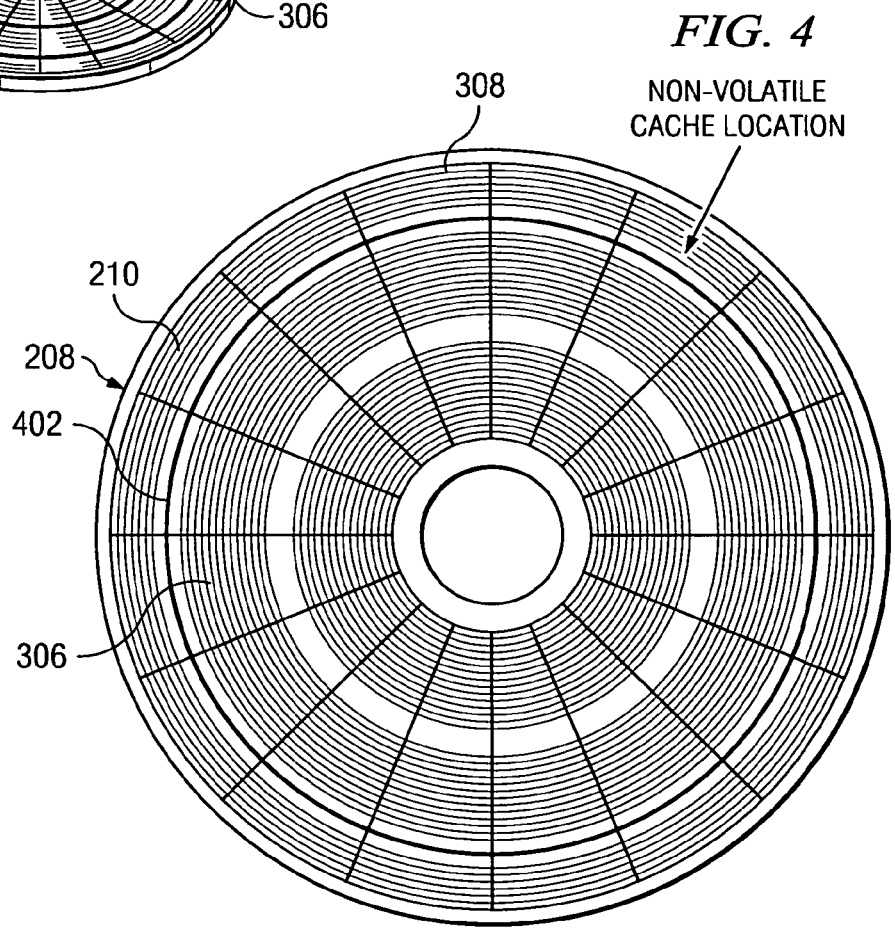
FIG. 4 is an overhead view showing one of the disks of the configuration shown in FIG. 3.

Referring to FIG. 4, there is shown the surface of a disk 208 of the hard drive 120 in greater detail. FIG. 4 depicts tracks 306 and sectors 308. FIG. 4 further shows a circular boundary 402, which defines the OD zone 210 of disk 208. Thus, respective NV cache locations on disk 208 are positioned along the outer edge of disk 208.

FIG. 5 is a flow chart showing the procedure carried out by host 110 in setting up the NV cache function in hard disk drive 120. After generating a start command, as shown by function block 502, the host controller sends power to the drive 120 and also configures the drive, as shown by function block 504. The drive configuration routine spins-up the disk drive 120, and sends an SCSI "inquiry" command to the drive, to get device type and status. The operating system of data processing system 100 then uses this information to communicate with the disk drive 120.

Following the drive configuration, an NV cache configuration command is sent to the disk drive, as shown by function block 506. This is done to determine whether the disk drive does or does not support the NV cache function. If the answer to this inquiry is negative, decision block 508 indicates that a NO signal is sent, whereupon the NV cache setup routine is ended. However, if the disk drive does support the NV cache, decision block 508 shows that a YES signal is sent, and the NV cache is configured, as indicated by function block 510.

Referring further to FIG. 5, function block 510 also indicates that configuring the NV cache function includes issuing a Mode Select command to the disk drive. In response to the Mode Select command, the hard disk drive sets appropriate parameters in a new Mode Page that enables the caching function. The parameters contained in the Mode Page would include the size or capacity of the NV cache, in order to provide a level at which emptying the NV cache would become a priority task for the disk drive. A further parameter would be the amount of SCSI bus idle time that the disk drive would wait, before beginning to move the NV cache contents to normal, or longer term, storage locations on the hard disk. The caching parameters would persist over power boundaries, until another Mode Select command was issued from the SCSI host controller 110, to change or disable the NV cache functionality.

Figure 6:
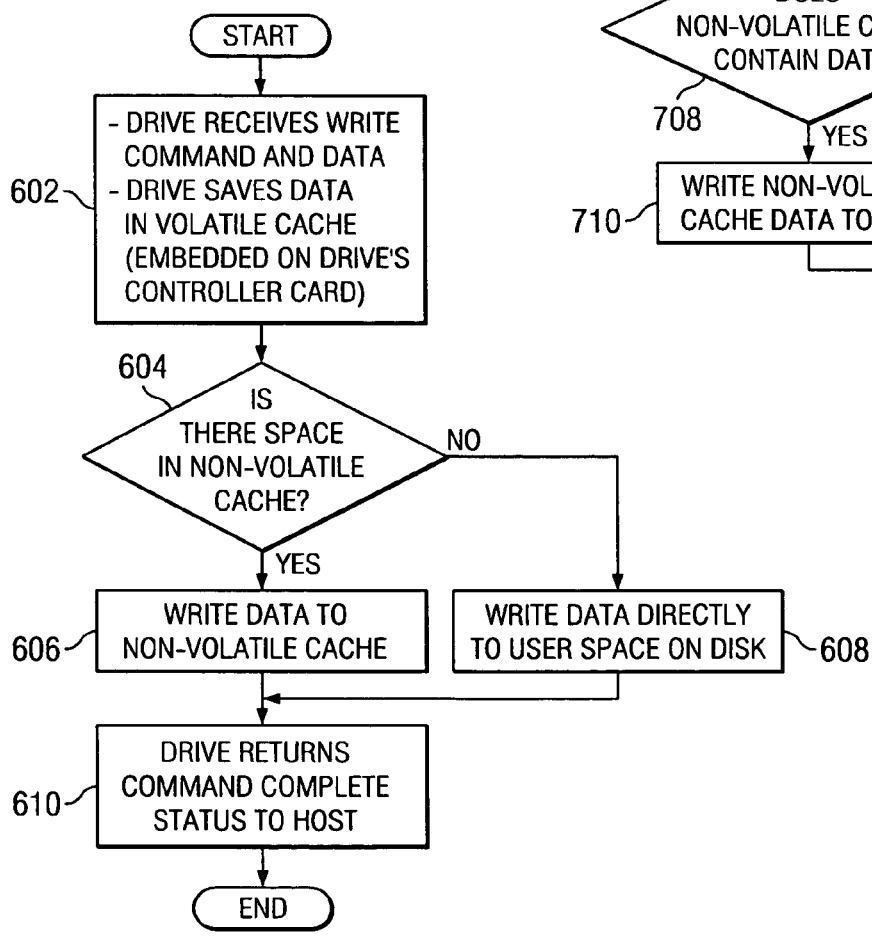
FIG. 6 is flow chart illustrating the procedure for storing data in the NV cache in response to a write command, in the embodiment of the invention shown in FIG. 2.

Referring to FIG. 6, there is shown a flow chart depicting the procedure carried out by disk drive 120 in writing data to an NV cache location. Function block 602 indicates that the procedure commences when drive 120 receives a write command from the host controller 110, together with the associated data to be stored. Read/write electronics 204 of the disk drive is operated to initially save the data in volatile cache 206. The drive 120 is then operated, as shown by decision block 604, to determine whether or not space is available in the NV cache for the received data. If space is available, the received data is written to an NV cache location, as shown by function block 606. The NV cache location is in the OD zone 210 of disk 208, as described above.

Referring further to FIG. 6, function block 608 shows that if space is not available in the NV cache for the data received in connection with the write command, the data is written directly to a user space on a disk. That is, the data is moved to a conventional disk space which may be located anywhere on the disk. Generally, this is a location where the data is intended to remain on a longer term basis than when it is in cache storage. Typically, data will remain in the longer term disk storage until it is removed from the disk drive, such as by a subsequent instruction or command.

Function block 610 indicates that after the data has been moved either to an NV cache location 212 or to a longer term disk storage location, disk drive 120 returns a command complete status to host controller 110, to end the write NV cache operation.

In a useful embodiment of the invention, the NV cache space would occupy only a small number of the above-described storage cylinders at the disk OD zone. It is anticipated that this would significantly enhance performance during write operations for two reasons: (1) the data rate is approximately 20% faster at the OD of the disk than the average data rate over the entire disk drive; and (2) the seek time within the NV cache area on the disk is at least two to three times less than the average disk seek time. For a typical two disk (4 head) drive, 500 cylinders of cache data would hold 1 gigabyte of data in a drive that would typically have 70,000 cylinders or more.

Figure 7:
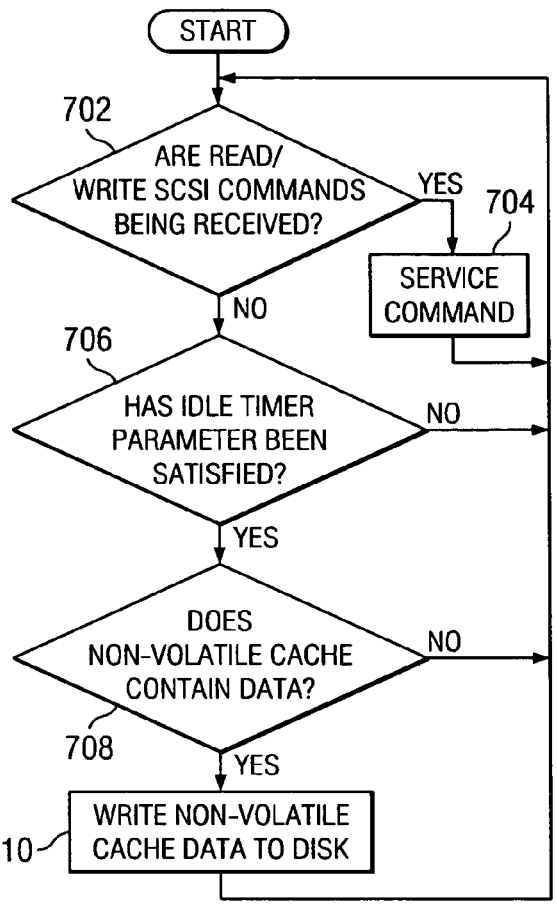
FIG. 7 is a flow chart illustrating the procedure for writing specified data from an NV cache location to a longer-term disk storage location, in the embodiment shown in FIG. 2.

Referring to FIG. 7, there is shown a flow chart illustrating the procedure for moving data from NV cache locations to the longer-term storage locations on disk 208. The procedure essentially comprises several sequential inquiries. The first inquiry, indicated by decision block 702, is whether or not any read command or write command is currently being received by disk drive 120 from the SCSI host controller 110. If a command is being received, the command is serviced as indicated by function block 704.

Referring further to FIG. 7, decision block 706 shows that if disk drive 120 is not currently receiving a read or write command, a determination is made as to whether the SCSI bus idle time parameter, referred to above, has elapsed. If it has, a final inquiry is made, as shown by decision block 708, to determine whether or not the NV cache contains data. If it does, the data is written from the NV cache to longer-term storage locations on the hard disk, as indicated by function block 710.

Previously, when data was being written to disk drive 120 by the host controller, it could take on the order of 10 milliseconds to write data from the volatile cache to the disk storage location. However, data can be written from the NV cache, located at the disk OD, to the final or longer-term disk storage location within a period of about 2 milliseconds. It is anticipated that embodiments of the invention will be able to reduce the time for writing data to final disk storage locations, using the NV cache, to an average of 5 milliseconds.

When the disk drive is opened for the first time by the Operating System (O/S) of data processing system 100, the maximum capacity of the hard drive is generally set, by a returned Read Capacity SCSI command. Typically, the Operating System would not expect the capacity of the hard drive 120 to change, once the Read Capacity Command has been sent to the drive. However, some amount of storage capacity, at the disk OD, must be allocated for the NV cache. Accordingly, it might be desirable to have the hard drive configure the NV cache space before the drive is initially configured by the Operating System. That is, a Read Capacity SCSI command would return a lower maximum Logical Block Address (LBA) value, after the cache size was defined using the Mode Select Command. For example, the capacity of the drive could be set using a special diagnostic utility, to define the cache before the drive was opened by the O/S for the first time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a computer configuration comprising a hard disk drive having at least one magnetic disk and a volatile cache memory, a method for writing specified data to said disk drive comprising the steps of:

receiving, by the disk drive from a host controller, a non-volatile cache configuration command, which is used to determine whether the disk drive supports a non-volatile cache function;

said disk drive connected to said host controller using an I/O bus;

said host controller included within a host computer system;

responsive to a receipt of said non-volatile cache configuration command: sending, from said disk drive to said host controller, an indication of whether or not said disk drive supports said non-volatile cache function; and in response to said disk drive supporting said non-volatile cache function:

receiving, by said disk drive, a Mode Select command that was sent by said host controller that defines attributes for a non-volatile cache space;

in response to receipt of said Mode Select command, said disk drive setting parameters in a new Mode Page that enables non-volatile caching;

said parameters persisting over power boundaries until another Mode Select command is received from said host controller that either changes said parameters or disables non-volatile caching;

reserving a specified portion of an Outside Diameter (OD) zone of a selected one of said disks for said non-volatile cache space;

initially storing said specified data in said volatile cache memory in response to a write command sent to said disk drive;

writing said specified data from said volatile cache memory to said non-volatile cache space of said selected disk; and subsequently writing said specified data from said non-volatile cache space to a longer term storage location on a disk of said disk drive.

2. The method of claim 1, wherein:
said step of writing said specified data from said non-volatile cache space to said longer term storage location is performed when said disk drive is in an idle mode.

3. The method of claim 2, wherein:
said non-volatile cache space is managed by said disk drive, said management being transparent to said host controller connected to control operation of said hard disk drive.

4. The method of claim 1, wherein:
said parameters include a maximum data storage capacity intended for said non-volatile cache space and an SCSI bus idle time, said bus idle time intended to elapse before said disk drive commences writing said specified data from said non-volatile cache space to said longer term storage location.

5. The method of claim 1, wherein:
said specified data is written to said non-volatile cache space after confirming that said non-volatile cache space is available to receive said specified data.

6. The method of claim 5, wherein:
other received data is initially stored in said volatile cache memory when said non-volatile cache space is not available; and said other received data being written from said volatile cache memory directly to a longer term storage location on a disk of said disk drive when said non-volatile cache space is not available bypassing said non-volatile cache space, wherein said other received data is never stored in said non-volatile cache space.

7. In a computer configuration comprising a hard disk drive having at least one magnetic disk and a volatile cache memory, apparatus for writing specified data to said disk drive comprising:
   a host controller connected to said disk drive using an I/O bus, said host controller included within a host computer system;
   said disk drive receiving, from said host controller, a non-volatile cache configuration command, which is used to determine whether the disk drive supports a non-volatile cache function;
   responsive to a receipt of said non-volatile cache configuration command: said disk drive sending, to said host controller, an indication of whether or not said disk drive supports said non-volatile cache function; and
   in response to said disk drive supporting said non-volatile cache function:
      said host controller sending a Mode Select command to said disk drive that defines attributes for a non-volatile cache space;
      in response to receipt of said Mode Select command by said disk drive, said disk drive setting parameters in a new Mode Page that enables non-volatile caching;
      said parameters persisting over power boundaries until another Mode Select command is received from said host controller that either changes said parameters or disables non-volatile caching;
      said host controller configuring said disk drive to reserve a specified portion of an Outside Diameter (OD) zone of a selected one of said disks for said non-volatile cache space;
      disk drive read/write electronics operable to initially store said specified data in said volatile cache memory, in response to a write command sent to said disk drive, and to thereafter write said specified data from said volatile cache memory to said non-volatile cache space of said selected disk; and
      a disk drive controller for operating said read/write electronics to write said specified data from said non-volatile cache space to a longer term storage location on a disk of said disk drive.

8. The apparatus of claim 7, wherein:
said specified data is written from said non-volatile cache space to said longer term storage location when said disk drive is in an idle mode.

9. The apparatus of claim 8, wherein:
said non-volatile cache space is managed by said disk drive controller, said management being transparent to said host controller.

10. The apparatus of claim 8, wherein:
said parameters include a maximum data storage capacity intended for said non-volatile cache space, and an SCSI bus idle time.

11. The apparatus of claim 7, wherein:
said specified data is written to said non-volatile cache space after confirming that said non-volatile cache space is available to receive said specified data.

12. In a computer configuration comprising a hard disk drive having at least one magnetic disk and a volatile cache memory, a computer program product that is stored in a computer-recordable medium for writing specified data to said disk drive, said computer program product comprising:
   first instructions for receiving, by the disk drive from a host controller, a non-volatile cache configuration command, which is used to determine whether the disk drive supports a non-volatile cache function;
   said disk drive connected to said host controller using an I/O bus;
   said host controller included within a host computer system;
   responsive to a receipt of said non-volatile cache configuration command: second instructions for sending, from said disk drive to said host controller, an indication of whether or not said disk drive supports said non-volatile cache function; and
   in response to said disk drive supporting said non-volatile cache function:
      third instructions for receiving, by said disk drive, a Mode Select command that was sent by said host controller that defines attributes for a non-volatile cache space;
      in response to receipt of said Mode Select command, said disk drive setting parameters in a new Mode Page that enables non-volatile caching;
      said parameters persisting over power boundaries until another Mode Select command is received from said host controller that either changes said parameters or disables non-volatile caching;
      fourth instructions for reserving a specified portion of an Outside Diameter (OD) zone of a selected one of said disks for a non-volatile cache space;
      fifth instructions for initially storing said specified data in said volatile cache memory in response to a write command sent to said disk drive;
      sixth instructions for writing said specified data from said volatile cache memory to said non-volatile cache space of said selected disk; and
      seventh instructions for subsequently writing said specified data from said non-volatile cache space to a longer term storage location on a disk of said disk drive.

13. The computer program product of claim 12, wherein:
said specified data from said non-volatile cache space is written to said longer term storage location when said disk drive is in an idle mode.

14. The computer program product of claim 13, wherein:
said non-volatile cache space is managed by said disk drive, said management being transparent to said host controller connected to control operation of said hard disk drive.

15. The computer program product of claim 13, wherein:
said parameters include a maximum data storage capacity intended for said non-volatile cache space, and an SCSI bus idle time.

16. The computer program product of claim 12, wherein:
said specified data is written to said non-volatile cache space after confirming that said non-volatile cache space is available to receive said specified data.

* * * * *